United States Patent [19]

Patzig

[11] 4,094,793
[45] June 13, 1978

[54] FILTER APPARATUS, ESPECIALLY FOR A LIQUID TO BE FED TO A POWER-PLANT CONDENSER

[75] Inventor: Dieter Patzig, Ratingen-Tiefenbroich, Germany

[73] Assignee: Ludwig Taprogge Reinigungsanlagen für Röhren-Wärmeaustauscher, Dusseldorf, Germany

[21] Appl. No.: 775,400

[22] Filed: Mar. 7, 1977

[30] Foreign Application Priority Data

Mar. 6, 1976   Germany .............................. 2609332

[51] Int. Cl.² ...................... B01D 25/02; B01D 29/24
[52] U.S. Cl. ................................ 210/323 R; 210/435; 210/483; 210/488; 210/497 R
[58] Field of Search ........... 210/488, 483, 340, 497 R, 210/232, 323 R, 314, 435; 55/484, 498; 209/281

[56] References Cited

U.S. PATENT DOCUMENTS

| | | | |
|---|---|---|---|
| 1,539,116 | 5/1925 | Heyn | 55/484 |
| 1,932,117 | 10/1933 | O'Brien et al. | 210/344 |
| 2,624,465 | 1/1953 | Kracklauer | 210/344 |
| 2,658,624 | 11/1953 | Redner | 210/344 |
| 2,675,920 | 4/1954 | Muller | 210/347 |
| 2,834,472 | 5/1958 | Lynford | 210/314 |
| 3,141,845 | 7/1964 | Nadherny | 210/345 |

FOREIGN PATENT DOCUMENTS 2,058,395   11/1970   Germany ............................ 210/488

*Primary Examiner*—William A. Cuchlinski, Jr.
*Assistant Examiner*—Gregory N. Clements
*Attorney, Agent, or Firm*—Karl F. Ross

[57] ABSTRACT

A filter for removing solids from water to be fed to a power-plant condenser comprises a substantially cylindrical housing and a substantially cylindrical filter basket in the housing which is provided with a radial inlet and an axial outlet for the water. The filter basket comprises a stack of axially continguous filter rings, each of which has an outwardly concave perforated periphery and a pair of flanges lying in planes perpendicular to the axis of the basket and bolted together to form the basket as a self-supporting unit.

9 Claims, 4 Drawing Figures

FILTER APPARATUS, ESPECIALLY FOR A LIQUID TO BE FED TO A POWER-PLANT CONDENSER

FIELD OF THE INVENTION

The present invention relates to a filter for removing solids from a liquid stream and, more particularly, to a filter for removing solids from water to be fed to a power-plant condenser.

BACKGROUND OF THE INVENTION

Water to be fed to a power-plant condenser is generally passed through a filter adapted to remove solid particles therefrom. It is customary to provide the filter with a generally cylindrical filter housing having fittings for feeding the water generally radially into the unit and recovering the filtered water generally axially therefrom. Within the filter housing there is provided a substantially cylindrical filter basket which traps the solid particles which may be entrained by the liquid.

In conventional apparatus of this type (see, for example, German Patent Dt-PS 20 58 395), the filter basket comprises filter-basket rings having their peripheries connected contiguously together, e.g. welded together.

The rings thus form, within the limits of precision and the tolerances of fabricating the rings, a cylindrical shell of the filter basket conforming to a right circular cylinder. Stiffening is provided by a three-dimensional frame construction of ring elements and rods whose parts are secured together by welding and/or bolting to the shell.

This construction has been found to be expensive in practice and investigations have shown that it has several drawbacks.

Firstly, during the formation of the filterbasket rings from a flat perforated plate or strip, which is stamped with generally cylindrical holes, the perforations, after bending, tend to decrease in diameter from the exterior toward the interior, i.e. in the flow direction. The result of this generally conical convergence of the perforations is that it permits particles to be trapped in a selflocking manner, thereby rendering it difficult to remove the solids during cleaning of the filter.

Secondly, the stability of the shell depends upon the thickness of the sheet metal from which it is formed. However, since an increase in thickness also means a corresponding increase in the covergence of the walls of the perforations, the construction of the conventional units must be a compromise between the desire to maintain the wall as thin as possible and a need to provide a thick wall to resist oscillation and vibration phenomena which develop within the filter. Such phenomena can cause fatigue of the material of the shell and eventual rupture thereof.

Thirdly, while the vibration phenomena and the tendency toward material fatigue of the shell can be counteracted by a corresponding configuration of the stiffening structure, the elements forming the stiffening means tend to disrupt the turbulent flow of the liquid traversing the filter basket because the components of the stiffening structure do not lie generally along the flow lines of the turbulent stream. As a result, the pressure loss is high and it is difficult to effectively clean the filter, i.e. to carry off the accumulated solids during the backwashing or other cleaning operation.

OBJECTS OF THE INVENTION

It is the principal object of the present invention to provide a filter for removing solids from a liquid stream whereby the aforedescribed disadvantages are obviated.

It is another object of the invention to provide an improved filter for removing solids from the water to be fed to a power-plant condenser in which the pressure loss is low or minimal, the stability of the filter surfaces is high, the ability to clean the filter is excellent, and the structure of the filter itself is inexpensive, simple and low in maintenance.

It is also an object of the invention to provide an improved filter basket for a filter of the aforementioned type which has high stability against vibration phenomena and, indeed, is fully selfsupporting without need for additional stiffening components.

Still a further object of my present invention is to provide a simplified filter for the water to be fed to a power-plant condenser.

SUMMARY OF THE INVENTION

These objects and others which will become apparent hereinafter are attained, in accordance with the present invention, in a filter for removing solids from liquids and, more particularly, for removing solids from a liquid stream (usually water) to be fed to a power-plant condenser, which comprises a generally cylindrical housing having an inlet fitting opening radially into this housing, an outlet fitting extending axially therefrom, and a cylindrical filter basket disposed within this housing and consisting of a stack of circular filter-basket rings constituted from relatively thin sheet metal and having outwardly concave peripheries and inwardly extending flanges at their opposite axial sides, the flanges of adjacent rings being bolted together so that the cylindrical basket has a generally cylindrical perforated outer shell while the bolted together flanges constitute a stiffening means for the basket.

Because of the outward concavity of the perforated surfaces of the rings, the perforations, even when the latter are stamped in cylindrical configuration from flat sheet metal and the flat sheet metal is rolled to form the rings, assume an inwardly flaring conicity quite different in effect from the inwardly convergent conicity characterizing earlier filter rings. Because of the inward divergence, solid particles which encounter the perforated surface do not tend to become wedged in the perforations and hence do not resist cleaning of the filter.

More specifically, the filter-basket rings according to the invention are outwardly concave in axial section and have inwardly bent flanges which lie in planes perpendicular to the axis of the basket and to the axis of the housing, the stiffening of the basket being effected by bolting together the flanges of adjacent filter rings.

The filter-basket rings of the present invention are each self-supporting, i.e. the radius of curvature of the axial section of the periphery of the ring is so dimensioned with respect to the sheet metal thickness that the ring can withstand axial compression forces, radial forces and vibration without additional stiffening required for earlier systems. Thus, in all geometric dimensions and for all phenomena which tend to arise in operation of the filter, each filter ring is sufficiently stiff to resist the forces in these dimensions and generated by the phenomena. The resulting filter basket is itself self-supporting and similarly resistant. Because of the high stiffness resulting from the oppositely bent peripheries and flanges, the perforations can have proportionately larger diameters than conventional sheet-metal filter rings and a greater number of perforations per unit area of the cylindrical surface of the filter.

Numerous advantages arise from the construction described above.

Firstly, because the central portion of the periphery of each ring is outwardly concave and merges into inwardly bent flanges at outwardly convex transition zones, it is, in axial section, a doubly curved shell in the static sense. Such a shell is extraordinarily stable and, even when constituted from very thin sheet metal, is self-supporting.

Secondly, the disadvantages of perforations or orifices which taper in the direction of liquid flow are completely eliminated because, in the configuration of the present invention wherein the periphery is a rotationally symmetrical body of outward concavity in axial cross section, the perforations no longer taper inwardly but rather taper outwardly and thereby completely preclude wedging of particles into the perforations in the flow direction.

Thirdly, since the filter-basket rings are self-supporting, the cost for the stiffening structure can be reduced and more or less limited to the expense of forming the aforedescribed flanges. It is of special advantage that these flanges lie partically along the flow lines of the turbulent or vortex stream which traverses the filter and thus constitute guide or stabilizing surfaces for this stream. As a result the pressure drop across the filter is surprisingly low.

Fourthly, the filter basket of the present invention can be very simply assembled and mounted in the apparatus since no additional structure is required. It can be inserted through the mouth of the housing and can be fixed thereto at the cover, if desired, or can be clamped, via the last flange of the stack, upon connection of the housing to the outflow duct. The filter basket can simply rest upon the floor of the housing. This facilitates maintenance and repair. Finally, the system is very easily cleaned and little if any solids remain after a conventional backwashing operation.

The curvature of the periphery of the ring is preferably constituted as a single-sheet hyperboloid of revolution.

The desired static effect is also obtained when the rotationally symmetrical surface is that of a paraboloid of rotation using the linear parameter of the paraboloid as the rotation axis.

In both cases relatively thin sheet metal can be used with a large number of large holes or perforations to produce a self-supporting filter-basket ring simply by choosing a radius of curvature of appropriate size.

Of course, the system of the present invention is also effective when the filter-basket ring has a concave curvature in axial section which corresponds to a circular arc. In general, the flanges of the filter-basket ring are formed from unperforated regions of the otherwise perforated sheet of strip.

According to still another feature of the invention, the stiffening means can include a ring or annular disk disposed between the flanges of adjoining rings and sandwiched between these flanges, being connected to the flanges by the bolts which hold them together. These additional rings do not detrimentally effect the flow of the liquid and indeed act as additional guiding members.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
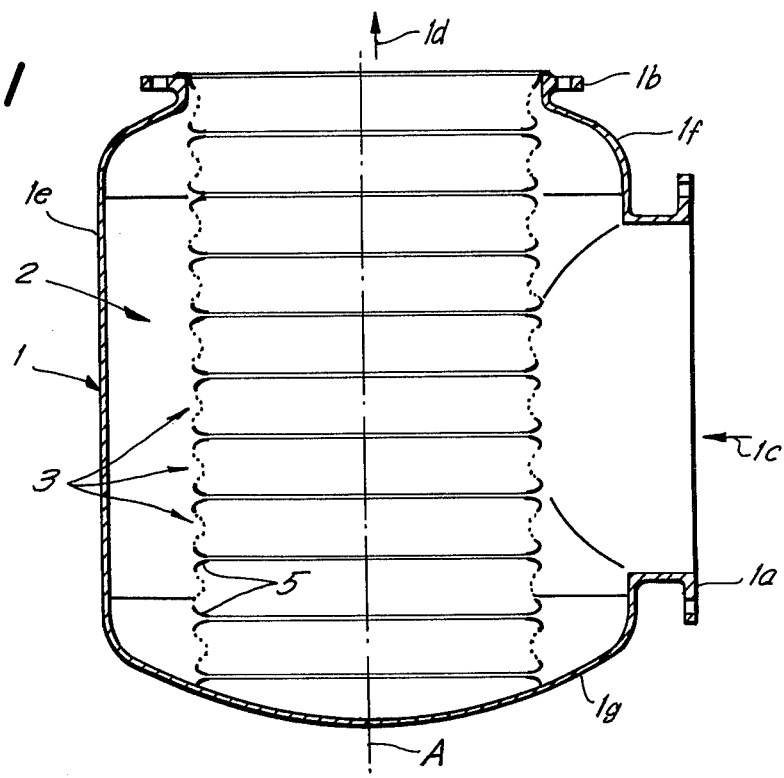
FIG. 1 is an axial cross-sectional view, partly in diagrammatic form, illustrating a filter according to the invention.

The filter illustrated in the drawing for removing solids from a liquid stream, especially for a stream of water to be supplied to a power plant condenser, comprises a cylindrical filter housing 1 and a substantially cylindrical filter basket 2. The housing 1 is provided with an inlet fitting 1a adapted to be flanged to the inlet pipe and receiving the water in the direction of arrow 1c. The fitting 1a opens radially into the cylindrical body 1e of the housing.

The liquid is discharged from the housing through an axial fitting 1b in the direction of arrow 1d. The housing 1 can also be provided with an upper member 1f which can be welded or detachably secured to the cylindrical portion 1e and a lower member 1g which forms the floor and can also be detachably secured to the cylindrical member 1e.

The filter basket comprises a stack of filter-basket rings 3 which are, at their opposite axial sides, connected together as will be described in greater detail below. The filter-basket rings 3 are formed from perforated sheet metal, generally in a flat state, which is rolled to the configuration of the ring, the sheet metal strip being welded to close the ring. During the stamping, cylindrical perforations 4 are formed in the central zone of the sheet-metal strip, the outer zones being unperforated so as to constitute the flanges 5 when the ring is rolled from the sheet-metal strip.

Figure 2:
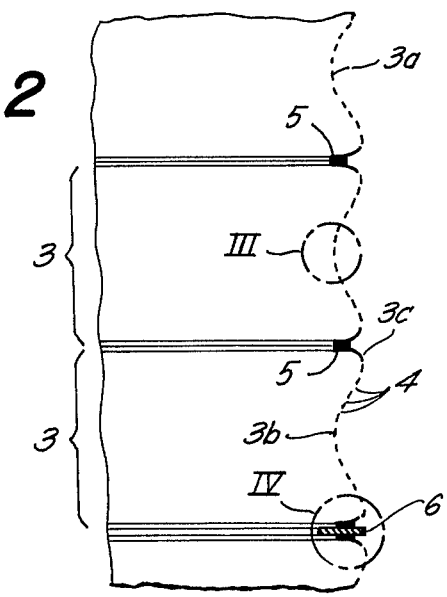
FIG. 2 is a diagrammatic view of a portion of the filter basket used in the filter of FIG. 1 greatly enlarged in scale.
Figure 3:
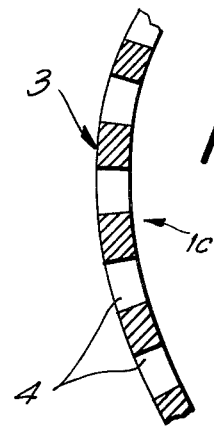
FIG. 3 is an enlarged cross-sectional view of the region III illustrated in FIG. 2.

As can be seen from FIGS. 2 and 3, each filter-basket ring 3 is geometrically in axial cross-section outwardly concave along its periphery and is formed at its opposite axial ends with inwardly bent flanges 5 lying perpendicular to the axis A of the basket. The radius of curvature of the periphery 3a of each ring is selected such that, with the double curvature resulting from the fully concave regions 3b and the outwardly convex regions 3c which merge into the flanges 5, each ring is fully self-supporting. No separate stiffening structure is thus required.

As will be apparent from FIGS. 2 and 3, the periphery 3a of the ring is formed as a rotationally symmetrical body such as a hyperboloid of revolution (single sheet). Similar static effects can be obtained when the surface is that of a paraboloid of revolution as mentioned previously, the rotation axis being the linear parameter of the paraboloid.

Figure 4:
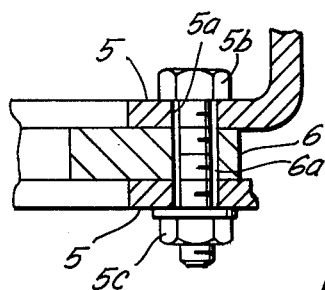
FIG. 4 is a detail view of the region IV of FIG. 2, likewise greatly enlarged in scale.

The flanges 5 are formed from unperforated portions of the sheet metal and are formed at angularly equispaced locations with bores 5a traversed by bolts 5b which cooperate with nuts 5c to secure the flanges of two adjoining rings together (see FIGS. 2 and 4). Between two flanges 5 of adjoining rings, a stiffening flat annular disk 6, with bores 6a aligned with the bores 5a, can be provided.

As can be seen especially from FIG. 3, in the concave regions of the rings, the perforations 4 widen or flare inwardly in the direction of liquid flow (arrow 1c). This prevents self-locking accumulation of solid particles within the perforations.

I claim:

1. A filter for removing solids from a liquid comprising a substantially cylindrical housing having an inlet and and outlet for said liquid, and a substantially cylindrical filter basket disposed in said housing and traversed by said liquid, passing from said inlet to said outlet, said filter basket comprising a stack of filter rings, each of said filter rings having an outwardly concave perforated periphery and a pair of inwardly extending annular flanges lying generally in planes perpendicular to the axis of said basket, and means for connecting the flanges of adjoining rings together, said perforated periphery being constituted as a stamped sheet metal body of rotation centered on the axis of the respective ring and having in axial section a rounded convex configuration reaching inwardly, said flanges being connected to said body of each ring on opposite sides thereof whereby each of said filter rings is fully self-supporting.

2. The filter defined in claim 1 wherein each of the perforated peripheries has a configuration corresponding to that of a single-sheet hyperboloid of revolution.

3. The filter defined in claim 1 wherein each of said perforated peripheries has a configuration conforming to that of a paraboloid of rotation with a rotation axis corresponding to the linear parameter of the rotated parabola.

4. The filter defined in claim 1 wherein each of said flanges is formed from an unperforated section of a perforated sheet.

5. The filter defined in claim 4, further comprising an annular stiffening disk received between the interconnected flanges of adjacent rings.

6. The filter defined in claim 5 wherein said liquid inlet and said liquid outlet extend radially of said housing, said basket being received in said housing and extending to said outlet.

7. The filter defined in claim 6 wherein said outlet is connected to a power-plant condenser and said inlet is connected to a source of water therefor.

8. The filter defined in claim 7 wherein each of said peripheries has a central concave portion and a pair of outwardly convex transition portions curving from said concave portion to said flanges.

9. The filter defined in claim 8 wherein the perforations of said concave portions flare inwardly.

* * * * *